(12) United States Patent
Hawker et al.

(10) Patent No.: US 9,517,790 B2
(45) Date of Patent: Dec. 13, 2016

(54) PACKAGING FOR UMBRELLA STROLLERS

(71) Applicant: Cosco Management, Inc., Wilmington, DE (US)

(72) Inventors: Ryan Hawker, Quincy, MA (US); David N Foster, Norfolk, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/337,802

(22) Filed: Jul. 22, 2014

(65) Prior Publication Data
US 2015/0054260 A1    Feb. 26, 2015

Related U.S. Application Data

(60) Provisional application No. 61/869,897, filed on Aug. 26, 2013.

(51) Int. Cl.
*B62B 7/08* (2006.01)
*B62B 9/16* (2006.01)
*B65D 85/06* (2006.01)

(52) U.S. Cl.
CPC . *B62B 9/16* (2013.01); *B62B 7/083* (2013.01)

(58) Field of Classification Search
CPC ............ B62B 7/004; B62B 7/086; B62B 7/08; B62B 9/16; B65D 85/06; B65D 85/68; B65D 2585/686; B65D 2585/6862; B65D 2585/6865
IPC .............................................. B62B 7/08, 7/086
See application file for complete search history.

(56) References Cited

U.S. PATENT DOCUMENTS

| | | | |
|---|---|---|---|
| 2,774,475 A | 12/1956 | Morken | |
| 2,979,189 A | 4/1961 | Allen | |
| 3,390,893 A * | 7/1968 | MacLaren | B62B 7/083 280/39 |
| 4,016,976 A | 4/1977 | Cosper | |
| 4,077,640 A * | 3/1978 | Perego | B62B 7/08 280/42 |
| 4,315,569 A * | 2/1982 | Jaeschke | B65D 5/4204 206/304 |
| 4,693,289 A * | 9/1987 | Taylor | A61G 3/0209 150/166 |
| 5,566,820 A | 10/1996 | Deaton | |
| 6,199,692 B1* | 3/2001 | Van Ness | B65D 5/5019 206/315.9 |
| 7,819,245 B1* | 10/2010 | Singh | B65D 73/0057 206/303 |
| 7,886,901 B1 | 2/2011 | Singh et al. | |
| 2003/0183542 A1* | 10/2003 | Bordon | B65D 85/06 206/304.2 |
| 2004/0050304 A1* | 3/2004 | Chen | B65D 19/0012 108/51.3 |
| 2012/0318710 A1* | 12/2012 | McIntosh | B65D 5/2038 206/764 |
| 2013/0062240 A1* | 3/2013 | Trontel | B65D 73/0064 206/459.5 |

\* cited by examiner

*Primary Examiner* — Frank Vanaman
(74) *Attorney, Agent, or Firm* — Barnes & Thornburg LLP (57) ABSTRACT

A juvenile stroller includes a frame, wheels coupled to the frame, and a seat coupled to the frame. The stroller also includes push handles coupled to the frame. The stroller is collapsible to assume a compact storage shape.

13 Claims, 5 Drawing Sheets

PACKAGING FOR UMBRELLA STROLLERS

PRIORITY CLAIM

This application claims priority under 35 U.S.C. §119(e) to U.S. Provisional Application Ser. No. 61/869,897, filed Aug. 26, 2013, which is expressly incorporated by reference herein.

BACKGROUND

The present disclosure relates to collapsible strollers for juveniles, and particularly to strollers including a collapsible frame assembly, a seat, and several wheels. More particularly, the present disclosure relates to packaging for an umbrella-style collapsible stroller.

SUMMARY

A stroller system in accordance with the present disclosure includes a collapsible seat-frame assembly and wheels adapted to be coupled to front and rear legs included in the seat-frame assembly. The seat-frame assembly also includes left and right push handles in an illustrative embodiment.

The seat-frame assembly can be reconfigured at the option of a caregiver to change from an expanded use mode to a relatively narrower collapsed storage mode. In the expanded use mode, the front and rear legs are spread apart to support a seat coupled to the seat-frame assembly for rolling movement on the wheels. In the collapsed storage mode, the rear legs are aligned to cause the rear wheels to lie in side-by-side relation to one another at a rear-wheel end of the collapsed stroller. The push handles are arranged to extend away from the rear wheels to define an opposite push-handle end of the collapsed stroller in the collapsed storage mode. Also in the collapsed storage mode, the front legs are arranged to extend away from the rear wheels toward the push handles to cause the front wheels to lie in side-by-side relation to one another and in close proximity to handgrips that are coupled to the push handles.

In illustrative embodiments, the collapsible stroller is an umbrella stroller and the stroller system further includes stroller packaging for the rear-wheel end of the collapsed stroller. The stroller packaging comprises an end cap including a container formed to include a wheel-storage chamber sized to receive and store the rear wheels and portions of the rear legs adjacent to the rear wheels when the stroller is retained in the collapsed storage position. The end cap is box-shaped in an illustrative embodiment.

In illustrative embodiments, the stroller packaging further includes a container closure coupled to the container to close an opening that opens into the wheel-storage chamber while the rear wheels are stored in the wheel-storage chamber. The end-cap container closure is formed to include a first rear-leg aperture through which a first rear leg of the stroller extends when the stroller is retained in the collapsed storage position and the rear wheels are retained in the wheel-storage chamber of the end-cap container. The end-cap container closure is also formed to include a second rear-leg aperture through which a second rear leg of the stroller extends when the stroller is retained in the collapsed storage position and the rear wheels are retained in the wheel-storage chamber of the end-cap container.

In illustrative embodiments, the end-cap container includes a floor panel and an endless side panel coupled to a perimeter edge of the floor panel to form the wheel-storage chamber. The end-cap container closure is coupled to an outer portion of the endless side panel and is arranged to lie in spaced-apart confronting relation to the floor panel of the end-cap container. In illustrative embodiments, point-of-purchase information (e.g., images and feature descriptions) is provided on exterior portions of the floor and side panels so as to be visible to consumers in a retail store.

In illustrative embodiments, the floor panel has a rectangular shape and the endless side panel includes four rectangular side-wall sections. In a shelf merchandise display at a retail store, a collection of collapsed strollers can be arranged in an orderly grid pattern with the end cap of each collapsible stroller system placed to be visible to consumers. The end caps provided at the rear-wheel end of a collection of collapsed strollers are stacked in rows and columns on shelves to provide a grid-like array of visible end caps so that point-of-purchase information provided on exterior portions of the floor panel of each of the end-cap containers in the collection is visible to a consumer walking past the strollers stacked in a shelf merchandise display. In a hanging merchandise display at a retain store, each collapsed stroller can be hung on a horizontal display rod by hanging curved handgrips that are coupled to the push handles on the horizontal display rod so that point-of-purchase information provided on exterior portions of the side panel is visible to consumers walking past strollers hung in the hanging merchandise display.

In alternative illustrative embodiments, the end cap is coupled to handgrips that are coupled to the push handles at the push-handle end of the collapsed stroller. When the stroller is collapsed, the left and right handgrips are arranged to lie in side-by-side relation. They are placed in a grip-storage chamber formed in a container included in the end cap. In another alternative illustrative embodiment, the end cap is coupled to the front wheels and to handgrips that are coupled to the push handles.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figures 1, 2, 3:
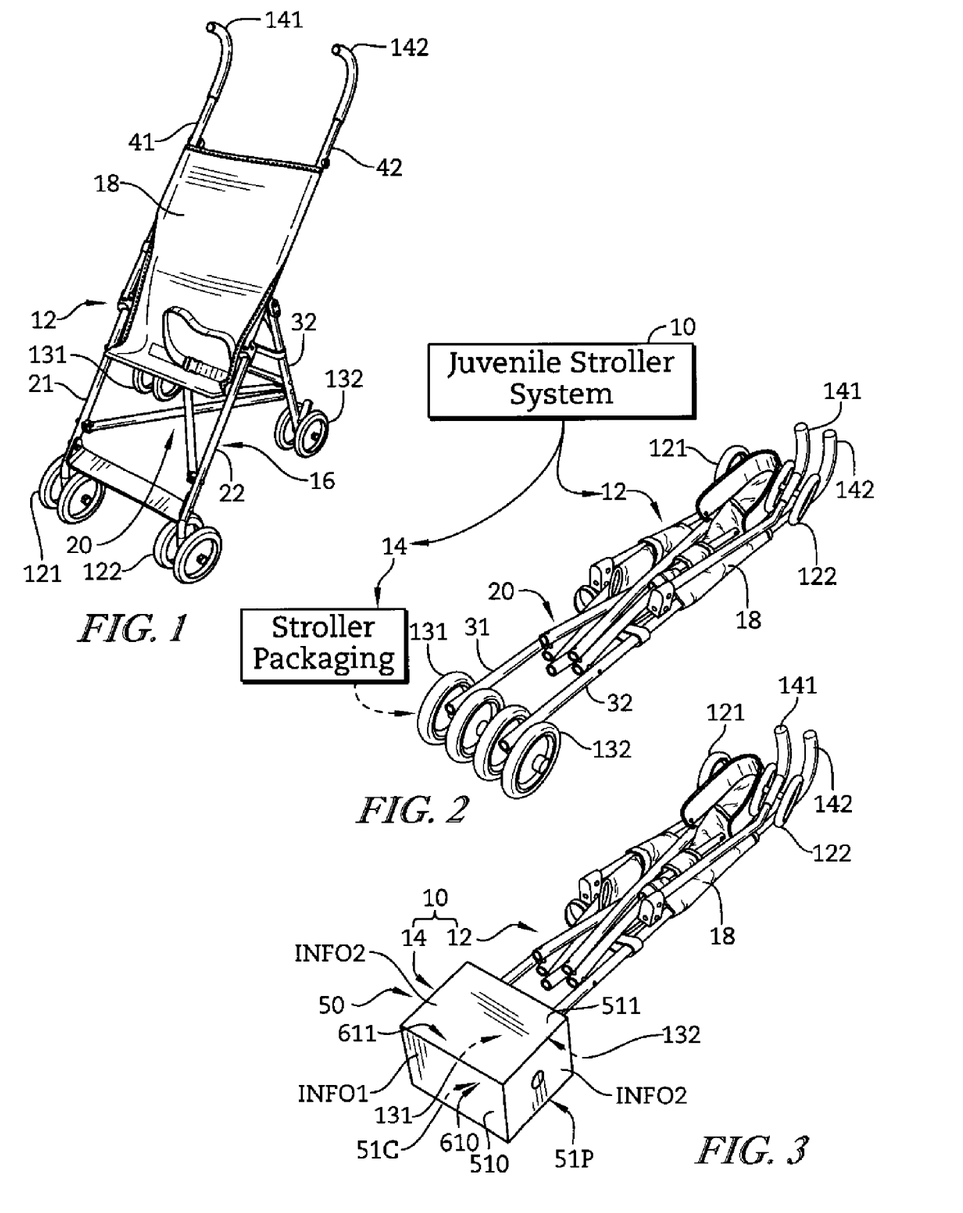
FIG. 1 is a perspective view of an illustrative collapsible stroller suitable for inclusion in a packaged stroller system in accordance with the present disclosure and showing the stroller in an illustrative expanded use mode.
FIG. 2 is a perspective view similar to FIG. 1 showing the stroller in an illustrative collapsed storage mode and also showing a diagrammatic illustration of stroller packaging that cooperates with the collapsed stroller to provide a juvenile stroller system.
FIG. 3 is a perspective view of illustrative stroller packaging made in accordance with a first embodiment of the present disclosure and coupled to a rear-wheel end of the collapsed stroller of FIG. 2 and showing point-of-purchase information INFO1 on exterior surfaces of a floor panel and point-of-purchase information INFO2 on exterior surfaces of a side panel of an end cap included in the stroller packaging.

A packaged juvenile stroller system 10 in accordance with a first embodiment of the present disclosure is suggested in FIGS. 1-3. Stroller system 10 includes a collapsible stroller 12 and stroller packaging 14 as suggested in FIG. 2. Stroller 12 can be reconfigured (at the option of a caregiver) to change from an expanded use mode shown in FIG. 1 to a collapsed storage mode shown in FIG. 2. Stroller packaging 14 in accordance with a first embodiment of the present disclosure is configured to receive and retain left and right rear wheels 131, 132 of stroller 12 after stroller 12 has been reconfigured to assume the collapsed storage mode as suggested in FIGS. 2 and 3 and shown, for example, in FIGS. 8-12.

Figure 13:
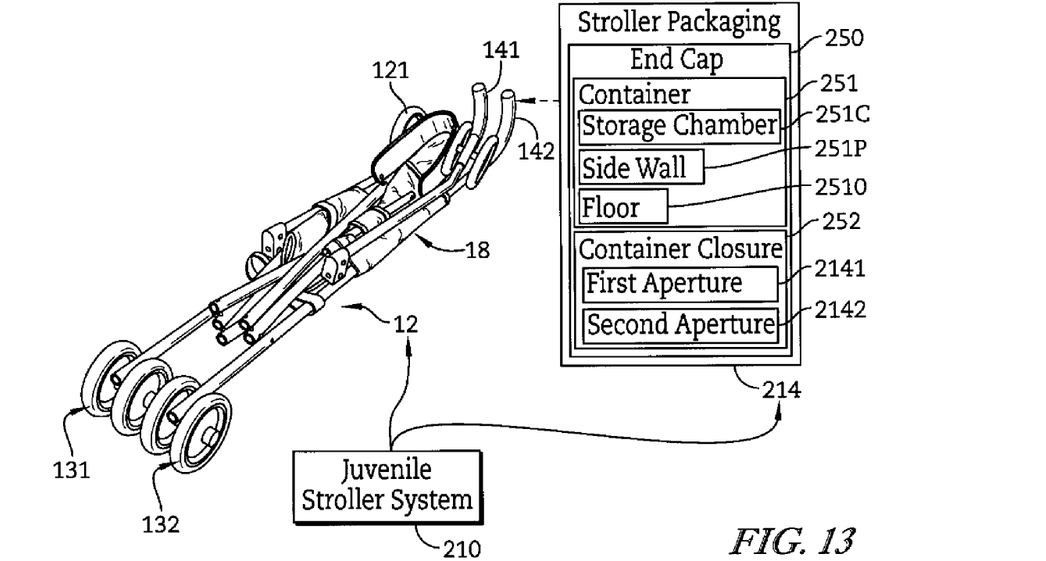
FIG. 13 is a diagrammatic view of a packaged stroller system in accordance with a second embodiment of the present disclosure in which handgrips that are coupled to push handles included in the collapsible seat-support frame are stored in a storage chamber formed in an end-cup container.

Stroller packaging 214 in accordance with a second embodiment of the present disclosure is configured to receive and retain left and right handgrips 141, 142 of stroller 12 after stroller 12 has assumed the collapsed storage mode to produce packaged juvenile stroller system 210 as suggested in FIG. 13. In a third embodiment shown in FIG. 14, stroller packaging 314 is configured to receive and retain left and right front wheels 121, 122 and left and right handgrips 141, 142 after stroller 12 has assumed the collapsed storage mode to produce packaged juvenile stroller system 310.

An illustrative stroller 12 suitable for use in packaged juvenile stroller system 10 is the umbrella stroller shown in FIG. 1. Stroller 12 includes a collapsible seat-support frame 16 and a seat 18 coupled to seat-support frame 16. In an illustrative embodiment, seat-support frame 16 includes left and right front legs 21, 22, left and right rear legs 31, 32, left and right push handles 41, 42, and a multi-segment support linkage 20 configured to provide means for linking legs 21, 22, 31, 32 and push handles 41, 42 to one another in any suitable manner to facilitate controlled collapse of stroller 12 initiated by a caregiver from an expanded use mode shown in FIG. 1 to a collapsed storage mode shown in FIG. 2. Left front wheels 121 are coupled to left front leg 21 and right front wheels 122 are coupled to right front leg 22 as suggested in FIG. 1. Left rear wheels 131 are coupled to left rear leg 31 and right rear wheels 132 are coupled to right rear leg 32 as suggested in FIGS. 1 and 7.

Figures 8, 9:
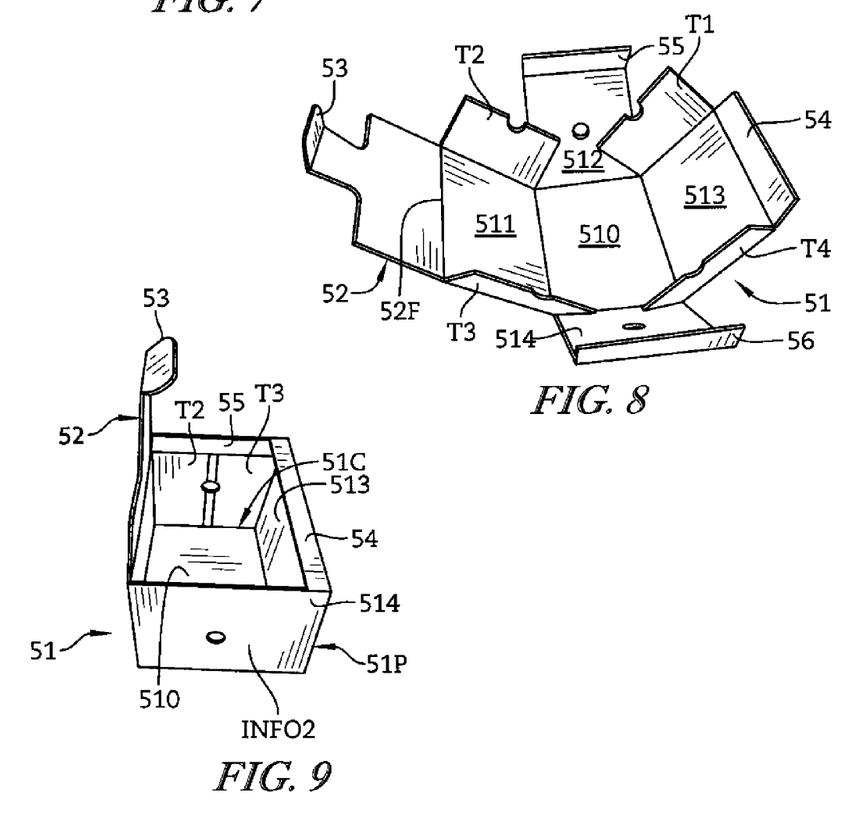
FIG. 8 is a perspective view showing an early stage of folding of the end-cap blank of FIG. 7.
FIG. 9 is a perspective view similar to FIG. 8 showing a later stage of folding of the end-cap blank.
Figures 10, 11:
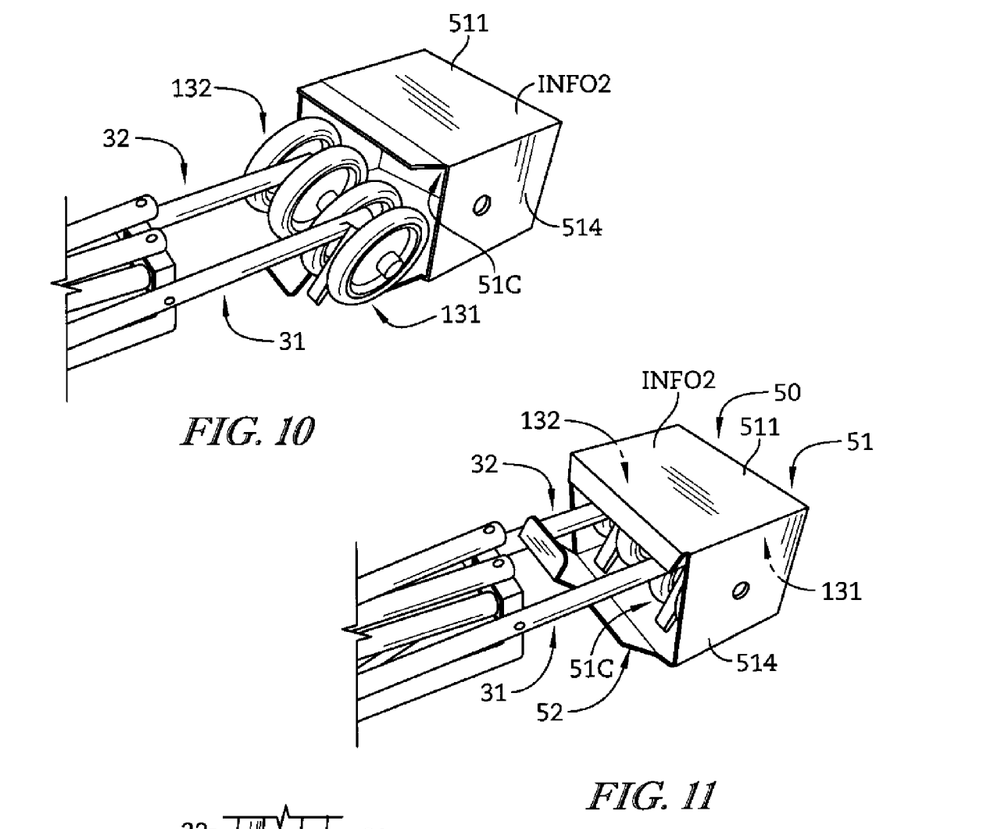
FIG. 10 is a perspective view showing insertion of the rear wheels into a wheel-storage chamber formed in a container included in the end cap.
FIG. 11 is a perspective view similar to FIG. 10 showing the rear wheels in a stored position in the wheel-storage chamber of the end-cap container.
Figure 12:
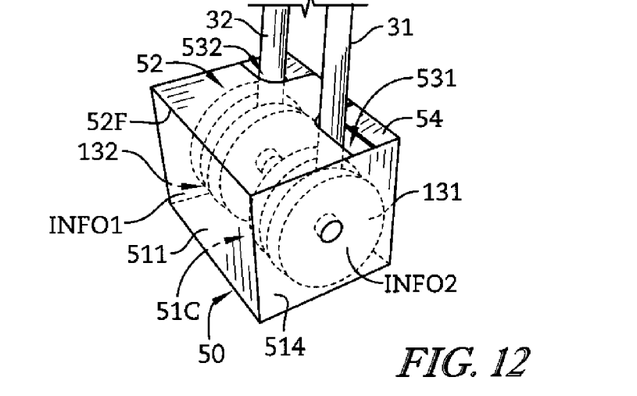
FIG. 12 is a perspective view of an upright end cap after movement of an end-cap container closure included in the end-cap blank to close an opening into the wheel-storage chamber formed in the end-cap container and showing a first rear leg extending upwardly out of a first leg-receiving aperture formed in the end-cap container closure and a second rear leg extending upwardly out of a second leg-receiving aperture formed in the end-cap container closure.

Stroller packaging 14 includes an end cap 50 that is coupled to rear wheels 131, 132 when stroller 12 is collapsed to assume a collapsed storage mode as shown, for example, in FIGS. 3 and 12. End cap 50 includes an end-cap container 51 and an end-cap container closure 52 as shown best in FIG. 12. End-cap container 51 is formed to include a wheel-storage chamber 51C as shown in FIGS. 9-11.

Stroller packaging 14 also includes point-of-purchase information INFO1, INFO2 provided on one or more exterior surfaces of end cap 50 as shown, for example, in FIG. 3. Point-of-purchase information INFO1 placed on an exterior surface 610 of a floor panel 510 included in end cap 50 is visible to a customer walking past a shelf merchandising display as suggested in FIG. 4 in which several packaged juvenile stroller systems 10 are stored by stacking end caps 50 included in those systems 10 in columns and rows on shelves. Point-of-purchase information INFO2 placed on an exterior surface 611 of a side-wall section 511 of an endless side panel 51P included in end cap 50 is visible to a customer walking past a hanging merchandising display as suggested in FIG. 5.

End-cap container 51 includes a floor panel 510 and an endless side panel 51P coupled to a rectangular perimeter edge of floor panel 510 in an illustrative embodiment as suggested in FIGS. 7-12. Side panel 51P includes four rectangular side-wall sections 511-514 and corner tabs T1-T4 shown in FIG. 7. Floor panel 510 and endless side panel 51P are included in an end-cap blank 50B shown in FIG. 7 and cooperate when assembled to form a wheel-storage chamber 51C for rear wheels 131, 132 as shown in FIGS. 11-14.

End-cap container closure 52 is coupled to end-cap container 51 as shown, for example, in FIG. 13. End-cap container closure 52 can be moved about a fold line 52F to close an aperture opening into wheel-storage chamber 51C.

Figure 5:
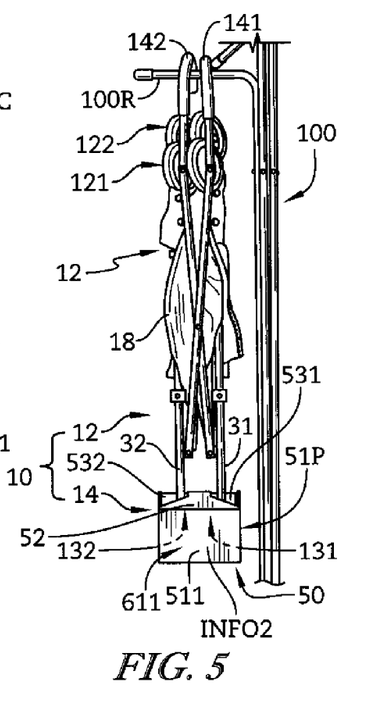
FIG. 5 is a perspective view of a hanging merchandise display in accordance with the present disclosure in which an end cap made and coupled to a collapsed stroller in accordance with the present disclosure includes a side panel having an exterior surface carrying point-of-purchase information INFO2 that is visible to a consumer walking past the hanging merchandise display when the stroller is hung from a horizontal display rod by placing curved push handles of the stroller on the horizontal display rod.

Closure 52 is formed to include a first rear-leg aperture 531 through which left rear leg 31 of stroller 12 extends when stroller 12 is moved to assume the collapsed storage mode as shown in FIGS. 5 and 12. Closure 52 is also formed to include second rear-leg aperture 532 through which right rear leg 32 of stroller 12 extends when stroller 12 is moved to assume the collapsed storage mode as shown in FIGS. 5 and 12.

It is within the scope of the present disclosure to design the die-cut end-cap blank 50B to make a positive lock on both first and second rear wheels 131, 132 (e.g., the hubs of those wheels). This will help to secure end cap 50 on rear wheels 131, 132 and deter unauthorized removal.

In an unorganized stroller storage rack (not shown) provided in a retail store, it is often difficult for consumers to find the stroller they want to buy. The point-of-purchase information associated with the racked strollers is often not visible to the consumer. The consumer must remove, inspect, and replace each stroller to see what strollers are available in the rack. Over time such racks become messy and disorganized. Folded umbrella strollers are not naturally stackable which further complicates the problem.

Figure 6:
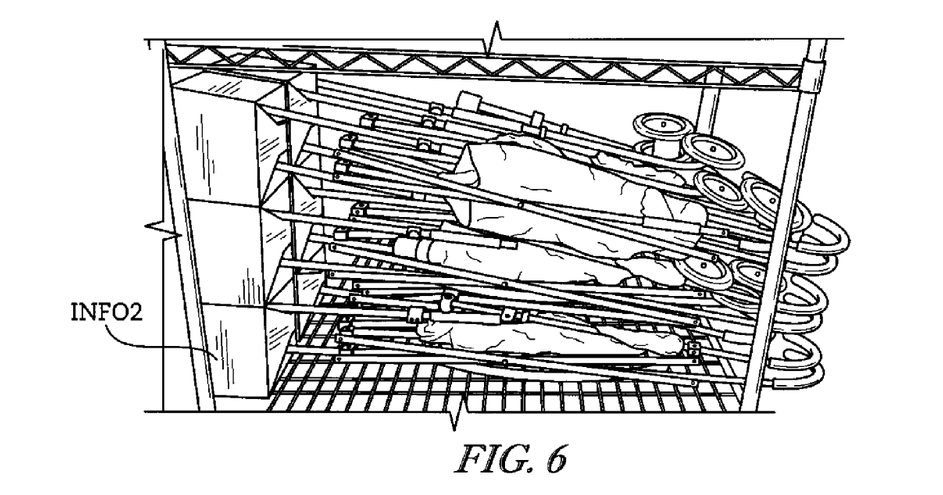
FIG. 6 is a side-elevation view of the shelved merchandise display in accordance with another embodiment of the present disclosure in which each packaged stroller system comprises a collapsed stroller and stroller packaging coupled to the rear wheels of the stroller and showing that end caps included in the stroller packaging are coupled to rear-wheel ends of a collection of collapsed strollers and showing that the end caps of six packaged stroller systems are stacked in two columns and three rows on a single underlying display shelf.

By placing an end cap 50 in accordance with the present disclosure on an end of a collapsed stroller 12 as suggested in FIGS. 8-12, a stackable or hangable packaged juvenile stroller system 10 is produced. These packaged juvenile stroller systems 10 are stacked on shelves easily and neatly in accordance with the present disclosure as shown, for example, in FIGS. 4 and 6. End cap 50 also allows for point-of-purchase information (e.g., image and feature description) INFO1 to be seen by consumers as suggested in FIG. 4. This makes it possible for a consumer to select an item before it is removed from the shelf. In a hanging merchandise display, point-of-purchase information INFO2 is also provided on end cap 50 so as to be visible to a passing consumer as suggested in FIG. 5.

Juvenile stroller system 10 includes a stroller 12 and stroller packaging 14 that is configured to be mounted on a portion of stroller 12 when stroller 12 is retained in a compact storage shape as suggested in FIGS. 2 and 3. Juvenile stroller system 10 provides a unit that can be displayed to the public in a retain store as suggested in FIGS. 4-6. After the stroller packaging 14 has been removed by a consumer, the stroller 12 can be unfolded by the consumer so that it is ready to be used as suggested in FIG. 1.

Stroller 12 includes a collapsible seat-support frame 16, a deformable seat 18, a first rear-wheel unit 131, and a first front-wheel unit 121 as shown, for example, in FIGS. 1 and 2. Collapsible seat-support frame 16 is configured to be converted by a caregiver from an expanded use mode wherein the collapsible seat-support frame 16 has a first width as suggested in FIG. 1 to a collapsed storage mode wherein the collapsible seat-support frame 16 has a relatively narrower second width as suggested in FIGS. 2 and 3. Deformable seat 18 is coupled to the collapsible seat-support frame 16 and made of a deformable material to change from a wide juvenile-supporting shape in the expanded use mode of the collapsible seat-support frame 16 as suggested in FIG. 1 to a relatively narrower narrow stowed shape in the collapsed storage mode of the collapsible seat-support frame 16. First rear-wheel unit 131 is coupled to a first rear leg 31 included in the collapsible seat-support frame 16 as suggested in FIG. 2. First front-wheel unit 121 is coupled to a first front leg 21 included in the collapsible seat-support frame 16 and arranged to lie at a first distance from the first rear-wheel unit 131 when the collapsible seat-support frame 16 is in the expanded use mode as suggested in FIG. 1 and at a relatively greater second distance from the first rear-wheel unit 131 when the collapsible seat-support frame 16 is in the collapsed storage mode as suggested in FIG. 2.

Stroller packaging 14 comprises an end cap 50 in an illustrative embodiment of the present disclosure as suggested in FIG. 3. End cap 50 includes a container 51 formed to include a wheel-storage chamber 51C sized to receive and store the first rear-wheel unit 131 without receiving and storing the first front-wheel unit 121 when the collapsible seat-support frame assumes the collapsed storage mode as shown, for example, in FIGS. 3 and 12. End cap 50 further includes a container closure 52 coupled to container 51 to close an opening that opens into wheel-storage chamber 51C while first rear-wheel unit 131 is stored in wheel-storage chamber 51C as suggested in FIGS. 9 and 12. Container closure 52 is formed to include a first rear-leg aperture 531 through which first rear leg 31 of collapsible seat-support frame 16 extends when collapsible seat-support frame 16 is in the collapsed storage mode and first rear-wheel unit 131 is retained in wheel-storage chamber 51C of container 51 as suggested in FIGS. 5 and 12. Container closure 52 of end cap 50 is positioned to lie between the first rear-wheel unit 131 and the first front-wheel unit 121 when collapsible seat-support frame 16 is in the collapsed storage mode and first front-wheel unit 121 is located outside of wheel-storage chamber 51C of container 51 as suggested in FIG. 5.

Stroller 12 further includes a first handgrip 141 coupled to a free end of a first push handle 41 included in collapsible seat-support frame 16 as shown, for example, in FIG. 1. First handgrip 141 is arranged to lie in spaced-apart relation to container 51 to locate deformable seat 18 and first front-wheel unit 121 therebetween when collapsible seat-support frame 16 is in the collapsed-storage mode as suggested in FIGS. 2 and 5. First handgrip 141 is curved to provide means for engaging a generally horizontal display rod 100R of a hanging merchandise display 100 to hang stroller 12 in a generally vertical orientation when collapsible seat-support frame 16 is in the collapsed storage mode so that point-of-purchase information INFO2 provided on exterior side-wall portions 511-514 of container 51 is visible to customers walking past a stroller 12 hung on the generally horizontal display rod 100R as suggested in FIG. 5.

Figure 7:
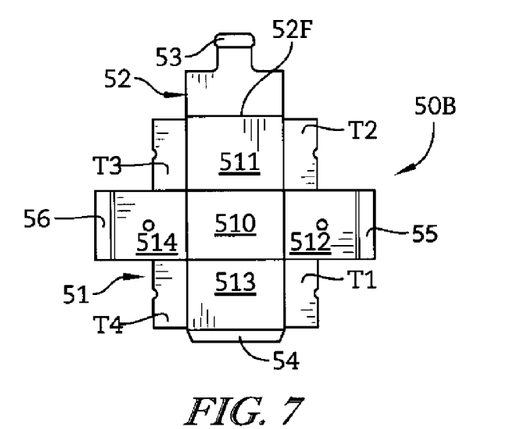
FIG. 7 is a top plan view of an end-cap blank in accordance with the present disclosure that is configured to be folded and used as shown, for example, in FIGS. 8-11 to form an end cap comprising an end-cap container and an end-cap container closure that can be coupled to a rear-wheel end of a collapsed stroller as suggested in FIG. 12.

Container 51 includes a floor panel 510 and a side panel 51P coupled to floor panel 510 to form wheel-storage chamber 51C as suggested in FIGS. 7-9. Side panel 51P is arranged to surround first rear-wheel unit 131 retained in wheel-storage chamber 51C as suggested in FIG. 12. Container closure 52 is coupled to side panel 51P and arranged to lie in a position between floor panel 510 and deformable seat 18 when collapsible seat-support frame 16 is in the collapsed storage mode. Point-of-purchase information INFO1 is provided on an exterior surface of floor panel 510 to be visible to a consumer viewing floor panel 510 of container 51 of end cap 50 when collapsible seat-support frame 16 is in the collapsed storage mode and an exterior surface of side panel 51P of container 51 of end cap 50 is in a stationary position on an underlying cap-support surface as suggested in FIG. 4. Point-of-purchase information INFO2 is provided on an exterior surface of side panel 51P to be visible to a consumer viewing side panel 51P of container 51 of end cap 50 when collapsible seat-support frame 16 is in the collapsed storage mode and is hanging from a display rod 100R to cause floor panel 510 to face downwardly toward ground underlying the display rod 100R as suggested in FIG. 5.

Collapsible seat-support frame 16 further includes a second rear-wheel unit 132 coupled to a second rear leg 32 included in collapsible seat-support frame 16 as suggested in FIGS. 1 and 2. Second rear-wheel unit 132 is arranged to lie in spaced-apart relation to first rear-wheel unit 131 to establish a first width therebetween when the collapsible seat-support frame is in the expanded use mode as suggested in FIG. 1 and to lie alongside first rear-wheel unit 131 to establish a relatively narrower second width therebetween when collapsible seat-support frame 16 is in the collapsed storage mode as suggested in FIGS. 2 and 3. Second rear-wheel unit 132 is stored in wheel-storage chamber 51C of container 51 alongside first rear-wheel unit 131 when collapsible seat-support frame 16 is in the collapsed storage mode as suggested in FIG. 12.

Container closure 52 is coupled to container 51 to close an opening that opens into wheel-storage chamber 51C while the first and second rear-wheel units 131, 132 are stored in wheel-storage chamber 51C as suggested in FIGS. 10-12. Container closure 52 is formed to include a first rear-leg aperture 531 through which first rear leg 31 extends when collapsible seat-support frame 16 is in the collapsed storage mode and a second rear-leg aperture 532 through which second rear leg 32 extends when collapsed seat-support frame 16 is in the collapsed storage mode as suggested in FIG. 12. Container 51 includes a floor panel 510 and an endless side panel 51P coupled to a perimeter edge of floor panel 510 to form wheel-storage chamber 51C and arranged to surround first and second rear-wheel units 131, 132. Container closure 52 is coupled to an outer portion of the endless side panel 51P and arranged to lie in spaced-apart confronting relation to floor panel 510. Container closure 52 is arranged to lie in a position between floor panel 510 and deformable seat 18 when collapsible seat-support frame 16 is in the collapsed storage mode as suggested in FIGS. 3 and 5. Floor panel 510 has a rectangular shape and endless side panel 51P comprises four rectangular side-wall sections 511, 512, 513, and 514 in an illustrative embodiment shown in FIGS. 7-9.

Collapsible seat-support frame 16 further includes a first push handle 41 that is arranged to extend away from first front leg 21 when collapsible seat-support frame 16 is in the expanded use position as shown in FIG. 1 and to lie alongside first front leg 21 when the collapsible seat-support frame is in the collapsed storage mode as suggested in FIG. 2. Stroller 12 further includes a first handgrip 141 coupled to first push handle 41 and arranged to lie alongside first front-wheel unit 121 and in spaced-apart location to end cap 50 containing first rear-wheel unit 131 to locate deformable seat 18 between first handgrip 141 and end cap 50 when collapsible seat-support frame 16 is in the collapsed storage mode as suggested in FIG. 2. First front-wheel unit 121 is arranged to lie between end cap 50 and first handgrip 141 when collapsible seat-support frame 16 is in the collapsed storage mode and first rear-wheel unit 131 is located in wheel-storage chamber 51C of container 51 of end cap 50 as suggested in FIG. 3. First handgrip 141 is curved to provide means outside of end cap 50 for engaging a display rod 100R of a hanging merchandise display to hang stroller 12 in a generally vertical orientation when stroller 12 is in the collapsed storage mode so the at point-of-purchase information INFO2 provided on exterior side-wall portions of container 51 of end cap 50 is visible to customers walking past strollers 12 hung on the display rod 100R as suggested in FIG. 5.

A collapsible stroller 12 includes a collapsible seat-support frame 16 including a front leg 21 and first and second rear legs 31, 32, a front wheel 121 coupled to front leg 21, rear wheels 131, 132 coupled to rear legs 31, 32, and first and second push handles 41, 42 arranged to extend away from rear wheels 131, 132 as suggested in FIG. 1. Collapsible stroller 12 is changeable from an expanded use mode in which the front and first and second rear legs 21, 31, 32 are spread apart to support a seat 18 coupled to the seat-support frame 16 for rolling movement on the wheels 121, 131, 132 to a collapsed storage mode in which the first and second rear legs 31, 32 are drawn together as suggested in FIGS. 1 and 2.

Figure 4:
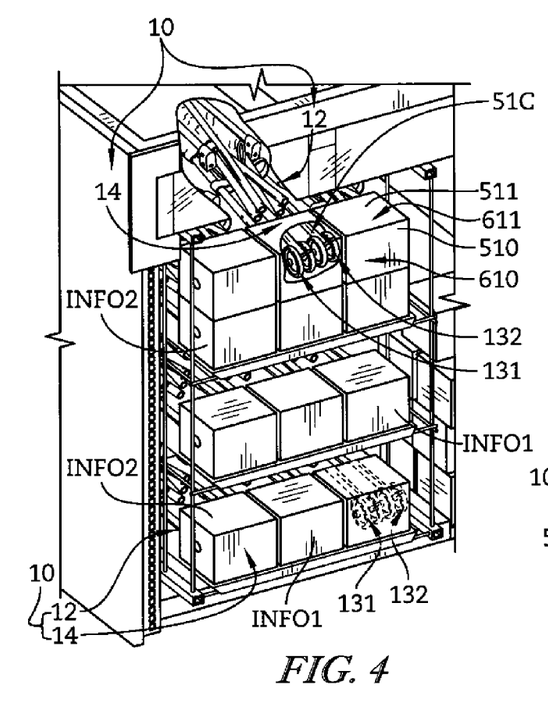
FIG. 4 is a perspective view of a shelf merchandising display in accordance with the present disclosure in which end caps made and coupled to collapsed strollers in accordance with the present disclosure are stacked in rows and columns on shelves so that any point-of-purchase information INFO1 provided on the exterior surface of a floor panel included in each end cap is visible to a consumer walking past the shelf-merchandising display.

Packaging 14 is configured to retain the collapsible stroller 12 in the collapsed storage mode to allow organized display of the collapsible stroller 12 and to provide point-of-purchase information INFO1, INFO2 during display of the collapsible stroller 12 in the collapsed storage mode so that a consumer may view the point-of-purchase information INFO1, INFO2 as suggested in FIGS. 4 and 5. The packaging 14 includes an end cap 50 formed to include a wheel-storage chamber 51C sized to receive and store the rear wheels 131, 132 coupled to the first and second rear legs 31, 32 and portions of the first and second rear legs 31, 32 therein when the collapsible stroller 12 is retained in the collapsed storage mode as suggested in FIGS. 3 and 12.

End cap 50 includes a container 51 and a container closure 52 arranged to cooperate with container 51 to define wheel-storage chamber 51C as suggested in FIG. 9. Container closure 52 is coupled to container 51 and arranged to move between an open position shown in FIG. 9 allowing insertion of the rear wheels 131, 132 into wheel-storage chamber 51C and a closed position shown in FIG. 12 blocking extraction of the rear wheels 131, 132 from wheel-storage chamber 51C.

Container closure 52 is formed to include a first rear-leg aperture 531 arranged to open into wheel-storage chamber 51C as suggested in FIG. 12. First rear leg 31 of collapsible stroller 12 extends through first rear-leg aperture 531 when rear wheels 131, 132 are retained in wheel-storage chamber 51C.

Container closure 52 is also formed to include a second rear-leg aperture 532 spaced apart from first rear-leg aperture 531 and arranged to open into wheel-storage chamber 51C. Second rear leg 32 of stroller 12 extends through second rear-leg aperture 532 when rear wheels 131, 132 are retained in wheel-storage chamber 51C as suggested in FIG. 12.

The endless side panel 51P includes a first side-wall section 511 coupled to a first edge of the floor panel 510, a second side-wall section 512 coupled to a second edge of the floor panel 510, a third side-wall section 513 coupled to a third edge of the floor panel 510 opposite of the first edge of the floor panel 510, and a fourth side-wall section 514 coupled to a fourth edge of the floor panel 510 opposite of the second edge of the floor panel 510 as suggested in FIGS. 7-9. Container closure 52 is coupled to the fourth side-wall section 514. The rear wheels 131, 132 are positioned to lie between the container closure 52 and floor panel 510, between first side-wall section 511 and third side-wall section 513, and between second side-wall section 512 and fourth side-wall section 514 while retained in wheel-storage chamber 51C.

A packaged stroller system 210 in accordance with a second embodiment of the present disclosure is shown in FIG. 13. System 210 comprises a stroller 12 and stroller packaging 214 (e.g., an end cap 250 like end cap 50) sized to mount on the handgrips 141, 142 of push handles 41, 42. End cap 250 includes a container 251 formed to include a storage chamber 251C sized to receive and store the first handgrip 141 without receiving and storing the first rear-wheel unit 121 when the collapsible seat-support frame 16 assumes the collapsed storage mode. Container 251 includes a floor 2510 and an endless side wall 251P coupled to a perimeter edge of floor 2510 to form storage chamber 251C.

End cap 250 further includes a container closure 252 coupled to the container 251 to close an opening that opens into the storage chamber 251C while the first handgrip 141 is stored in the storage chamber 251C. Container closure 252 is formed to include a first push-handle aperture 2141 through which the first push handle 141 of the collapsible seat-support frame 16 extends when the collapsible seat-support frame 16 is in the collapsed storage mode and the first handgrip 141 is retained in the storage chamber 251C of the container 251.

Stroller 12 further includes a second push handle 42 arranged to lie in laterally spaced-apart relation to the first push handle 41 when the collapsible seat-support frame 16 is in the expanded use position and a second handgrip 142 coupled to a free end of the second push handle 42. Second handgrip 142 is received and stored in the storage chamber 351C of container 251 alongside the first handgrip 141 when the collapsible seat-support frame 16 is in the collapsed storage mode.

Figure 14:
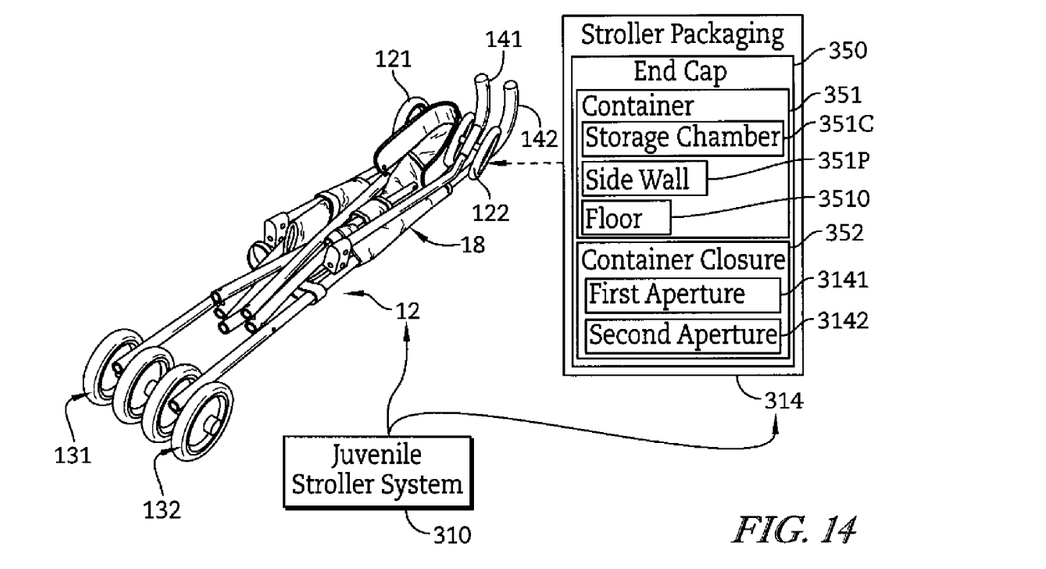
FIG. 14 is a diagrammatic view of a packaged stroller system in accordance with a third embodiment of the present disclosure in which handgrips and front wheels are stored in a storage chamber formed in an end-cap container.

A packaged stroller system 310 in accordance with a third embodiment of the present disclosure is shown in FIG. 14. System 310 comprises a stroller 12 and stroller packaging 314 (e.g., an end cap 350 like end cap 50) sized to mount on front wheels 121, 122 and on handgrips 141, 142. First front-wheel unit 121 is located in the storage chamber 351C of the container 351 along with first handgrip 141 when the collapsible seat-support frame 16 is in the collapsed storage mode. Second front-wheel unit 122 is located in storage chamber 351C of the container 351 along with second handgrip 142 when the collapsible seat-support frame 16 is in the collapsed storage mode.

End cap 350 includes a container 351 formed to include a storage chamber 351C sized to receive and store the first handgrip 141 without receiving and storing the first rear-wheel unit 121 when the collapsible seat-support frame 16 assumes the collapsed storage mode. Container 351 includes a floor 3510 and an endless side wall 351P coupled to a perimeter edge of floor 3510 to form storage chamber 251C.

End cap 350 further includes a container closure 352 coupled to the container 351 to close an opening that opens into the storage chamber 351C while the first handgrip 141 is stored in the storage chamber 351C. Container closure 352 is formed to include a first push-handle aperture 3141 through which the first push handle 141 of the collapsible seat-support frame 16 extends when the collapsible seat-support frame 16 is in the collapsed storage mode and the first handgrip 141 is retained in the storage chamber 351C of the container 351.

Stroller 12 further includes a second push handle 42 arranged to lie in laterally spaced-apart relation to the first push handle 41 when the collapsible seat-support frame 16 is in the expanded use position and a second handgrip 142 coupled to a free end of the second push handle 42. Second handgrip 142 is received and stored in the storage chamber 351C of container 351 alongside the first handgrip 141 when the collapsible seat-support frame 16 is in the collapsed storage mode.

The invention claimed is:

1. A juvenile stroller system comprising
a stroller including a collapsible seat-support frame configured to be converted by a caregiver from an expanded use mode wherein the collapsible seat-support frame has a first width to a collapsed storage mode wherein the collapsible seat-support frame has a relatively narrower second width, a deformable seat coupled to the collapsible seat-support frame and made of a deformable material to change from a wide juvenile-supporting shape in the expanded use mode of the collapsible seat-support frame to a relatively narrower narrow stowed shape in the collapsed storage mode of the collapsible seat-support frame, a first rear-wheel unit coupled to a first rear leg included in the collapsible seat-support frame, and a first front-wheel unit coupled to a first front leg included in the collapsible seat-support frame and arranged to lie at a first distance from the first rear-wheel unit when the collapsible seat-support frame is in the expanded use mode and at a relatively greater second distance from the first rear-wheel unit when the collapsible seat-support frame is in the collapsed storage mode, and
an end cap including a container formed to include a wheel-storage chamber sized to receive and store the first rear-wheel unit without receiving and storing the first front-wheel unit when the collapsible seat-support frame assumes the collapsed storage mode,
wherein the collapsible seat-support frame further includes a second rear-wheel unit coupled to a second rear leg included in the collapsible seat-support frame, the second rear-wheel unit is arranged to lie in spaced-apart relation to the first rear-wheel unit to establish a first width therebetween when the collapsible seat-support frame is in the expanded use mode and to lie alongside the first rear-wheel unit to establish a relatively narrower second width therebetween when the collapsible seat-support frame is in the collapsed storage mode, and the second rear-wheel unit is stored in the wheel-storage chamber of the container alongside the first rear-wheel unit when the collapsible seat-support frame is in the collapsed storage mode, and
wherein the end cap further includes a container closure coupled to the container to close an opening that opens into the wheel-storage chamber while the first and second rear-wheel units are stored in the wheel-storage chamber and the container closure is formed to include a first rear-leg aperture through which the first rear leg extends when the collapsible seat-support frame is in the collapsed storage mode and a second rear-leg aperture through which the second rear leg extends when the collapsed seat-support fame is in the collapsed storage mode.

2. The system of claim 1, wherein the container includes a floor panel and an endless side panel coupled to a perimeter edge of the floor panel to form the wheel-storage chamber and arranged to surround the first and second rear-wheel units and the container closure is coupled to an outer portion of the endless side panel and arranged to lie in spaced-apart confronting relation to the floor panel.

3. The system of claim 2, wherein point-of-purchase information is provided on an exterior surface of the floor panel to be visible to a consumer viewing the floor panel of the container of the end cap when the collapsible seat-support frame is in the collapsed storage mode and an exterior surface of the side panel of the container of the end cap is in a stationary position on an underlying cap-support surface.

4. The system of claim 2, wherein point-of-purchase information is provided on an exterior surface of the side panel to be visible to a consumer viewing the side panel of the container of the end cap when the collapsible seat-support frame is in the collapsed storage mode and is hanging from a display rod to cause the floor panel to face downwardly toward ground underlying the display rod.

5. The system of claim 2, wherein the container closure is arranged to lie in a position between the floor panel and the deformable seat when the collapsible seat-support frame is in the collapsed storage mode.

6. The system of claim 2, wherein the floor panel has a rectangular shape and the endless side panel comprises four rectangular side-wall sections.

7. The system of claim 1, wherein the collapsible seat-support frame further includes a first push handle that is arranged to extend away from the first front leg when the collapsible seat-support frame is in the expanded use position and to lie alongside the first front leg when the collapsible seat-support frame is in the collapsed storage mode, and the stroller further includes a first handgrip coupled to the first push handle and arranged to lie alongside the first front-wheel unit and in spaced-apart location to the end cap containing the first rear-wheel unit to locate the deformable seat between the first handgrip and the end cap when the collapsible seat-support frame is in the collapsed storage mode.

8. The system of claim 7, wherein the first front-wheel unit is arranged to lie between the end cap and the first handgrip when the collapsible seat-support frame is in the collapsed storage mode and the first rear-wheel unit is located in the wheel-storage chamber of the container of the end cap.

9. The system of claim 7, wherein the first handgrip is curved to provide means outside of the end cap for engaging a display rod of a hanging merchandise display to hang the stroller in a generally vertical orientation when the stroller is in the collapsed storage mode so the at point-of-purchase information provided on exterior side-wall portions of the container of the end cap is visible to customers walking past strollers hung on the display rod.

10. A juvenile stroller system comprising
a collapsible stroller including a collapsible seat-support frame including a front leg and first and second rear legs, a front wheel coupled to the front leg, rear wheels coupled to the rear legs, and first and second push handles arranged to extend away from the rear wheels, the collapsible stroller being changeable from an expanded use mode in which the front and first and second rear legs are spread apart to support a seat coupled to the seat-support frame for rolling movement on the wheels to a collapsed storage mode in which the first and second rear legs are drawn together, and
packaging configured to retain the collapsible stroller in the collapsed storage mode to allow organized display of the collapsible stroller and to provide point-of-purchase information during display of the collapsible stroller in the collapsed storage mode so that a consumer may view the point-of-purchase information, wherein the packaging includes an end cap formed to include a wheel-storage chamber sized to receive and store the rear wheels coupled to the first and second rear legs and portions of the first and second rear legs therein when the collapsible stroller is retained in the collapsed storage mode,
wherein the end cap includes a container and a container closure arranged to cooperate with the container to define the wheel-storage chamber and the container closure is coupled to the container and arranged to move between an open position allowing insertion of the rear wheels into the wheel-storage chamber and a closed position blocking extraction of the rear wheels from the wheel-storage chamber,
wherein the container closure is formed to include a first rear-leg aperture arranged to open into the wheel-storage chamber, the first rear leg of the collapsible stroller extends through the first rear-leg aperture when the rear wheels are retained in the wheel-storage chamber, the container closure is also formed to include a second rear-leg aperture spaced apart from the first rear-leg aperture and arranged to open into the wheel-storage chamber, and the second rear leg of the stroller extends through the second rear-leg aperture when the rear wheels are retained in the wheel-storage chamber.

11. The stroller system of claim 10, wherein the container includes a rectangular floor panel and an endless side panel coupled to a perimeter edge of the floor panel and the container closure is coupled to the endless side panel and arranged to lie in spaced-apart relation to the floor panel.

12. The stroller system of claim 11, wherein the endless side panel includes a first side-wall section coupled to a first edge of the floor panel, a second side-wall section coupled to a second edge of the floor panel, a third side-wall section coupled to a third edge of the floor panel opposite of the first edge of the floor panel, and a fourth side-wall section coupled to a fourth edge of the floor panel opposite of the second edge of the floor panel, and the container closure is coupled to the fourth side-wall section.

13. The stroller system of claim 12, wherein the rear wheels are positioned to lie between the container closure and the floor panel, between the first side-wall section and the third side-wall section, and between the second side-wall section and the fourth side-wall section while retained in the wheel-storage chamber.

* * * * *